United States Patent [19]

Aylworth

[11] E Re. 28,994

[45] Reissued Oct. 5, 1976

[54] OVER THE CABINET DOOR ASSEMBLY

[75] Inventor: Milo Aylworth, Alto, Mich.

[73] Assignee: Westinghouse Electric Corporation, Pittsburgh, Pa.

[22] Filed: Nov. 12, 1975

[21] Appl. No.: 631,267

Related U.S. Patent Documents

Reissue of:

[64] Patent No.: 3,771,847
Issued: Nov. 13, 1973
Appl. No.: 216,415
Filed: Jan. 10, 1972

[52] U.S. Cl. ..... 312/245; 312/138 R; 312/323

[51] Int. Cl.[2] ..... A47B 67/02; A47F 3/00

[58] Field of Search ..... 312/138, 245–248, 312/282, 298, 322, 323, 348; 248/243, 318; 108/108; 49/197, 199, 202; 308/3.6, 3.8

[56] References Cited

UNITED STATES PATENTS

| | | | |
|---|---|---|---|
| 1,714,747 | 5/1929 | Worman | 312/138 |
| 2,118,328 | 5/1938 | Roland | 312/323 X |
| 2,925,918 | 2/1960 | Attwood | 248/243 X |
| 2,936,206 | 5/1960 | Wilmer et al. | 312/322 |
| 3,041,957 | 7/1962 | Liptay | 312/138 R |
| 3,297,374 | 1/1967 | Radek | 312/108 X |
| 3,467,432 | 9/1969 | Sullivan | 312/322 X |
| 3,488,097 | 1/1970 | Fall | 312/348 |
| 3,525,177 | 8/1970 | Robinson | 312/323 |
| 3,672,529 | 6/1972 | Feddersen et al. | 49/197 X |
| 3,679,275 | 7/1972 | Fall et al. | 312/348 |

FOREIGN PATENTS OR APPLICATIONS

| | | | |
|---|---|---|---|
| 435,953 | 10/1953 | Germany | 312/282 |

*Primary Examiner*—Casmir A. Nunberg
*Attorney, Agent, or Firm*—B. R. Studebaker

[57] ABSTRACT

A wall mounted, backless, cabinet with an over-the-cabinet door assembly feature wherein the front door of the cabinet slides to an open and stored position overlying the cabinet top.

6 Claims, 6 Drawing Figures

OVER THE CABINET DOOR ASSEMBLY

Matter enclosed in heavy brackets [ ] appears in the original patent but forms no part of this reissue specification; matter printed in italics indicates the additions made by reissue.

BACKGROUND OF THE INVENTION

This invention relates to wall mounted cabinets of the type employed in offices, medical examination rooms and the like and is particularly adapted for modern modular office partitioning schemes of the so-called "office landscaping" type. In prior art wall cabinets with a stored door feature the door generally slides to a stored position within the cabinet itself. These kinds of cabinets have two significant drawbacks. Since the cabinet door goes to a stored position within the cabinet the full height of the interior of the cabinet cannot be used for large books which will fit in the cabinet but extend into the space filled by the door when the door is in the stored position. Additionally, the guide systems employed in these kinds of cabinets invariably result in a binding action between the side walls of the cabinet and the edges of the door making it difficult to raise the door unless it is lifted from the exact center of the door itself. In other situations, the hardware employed to provide for the raising and storage of the door is visible when the door is in an open position thus distracting from the aesthetics of the cabinet.

In modern space dividing office systems such as that disclosed in the copending application Ser. No. 159,360 filed July 2, 1971 by William C. Anderson and Raymond A. Bleeker for "Space Divider System and Connector Assembly Therefore" it has become desirable for all of the office furniture or at least the majority thereof to be mountable to the space dividing wall system. The wall mounted, backless, cabinet with an over-the-cabinet door assembly feature of this invention is particularly suited for use in a modern office space dividing system of that type.

SUMMARY OF THE INVENTION

The over-the-cabinet door assembly of this invention is significantly superior to prior art wall mounted cabinets in that the door of the cabinet is stored in a position overlying the top wall of the cabinet, the door can be raised and moved to a stored position by employing only little effort at any point along the length of the cabinet door and except for one plate of a simple hinge the entire slide mechanism is hidden from view even in the stored position.

The foregoing is accomplished in accordance with the present invention by providing a backless wall mounted cabinet including side walls, a bottom wall, a top wall, and a door with slide means secured to the back surface of the door and hinge means secured to the front edge of the top wall and to said slide means thereby permitting the door to slide to a stored position overlying the top wall. The slide means includes a first track secured to the door, a second track secured to the hinge and a roller bearing carriage coacting with the first and second tracks to provide relative movement therebetween.

BRIEF DESCRIPTION OF THE DRAWING

Many of the attendant advantages of the present invention will become more readily apparent and better understood as the following detailed description is considered in connection with the accompanying drawing, in which.

DESCRIPTION OF THE PREFERRED EMBODIMENT

Figure 1:
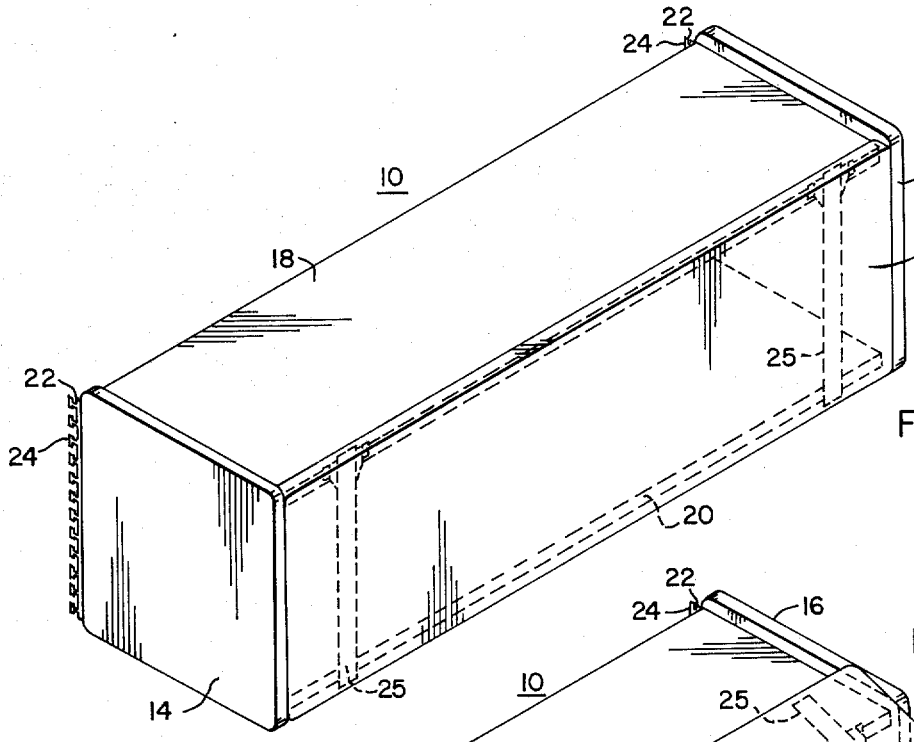
FIG. 1 is a perspective view of the cabinet of this invention with the door in a closed position.
Figure 2:
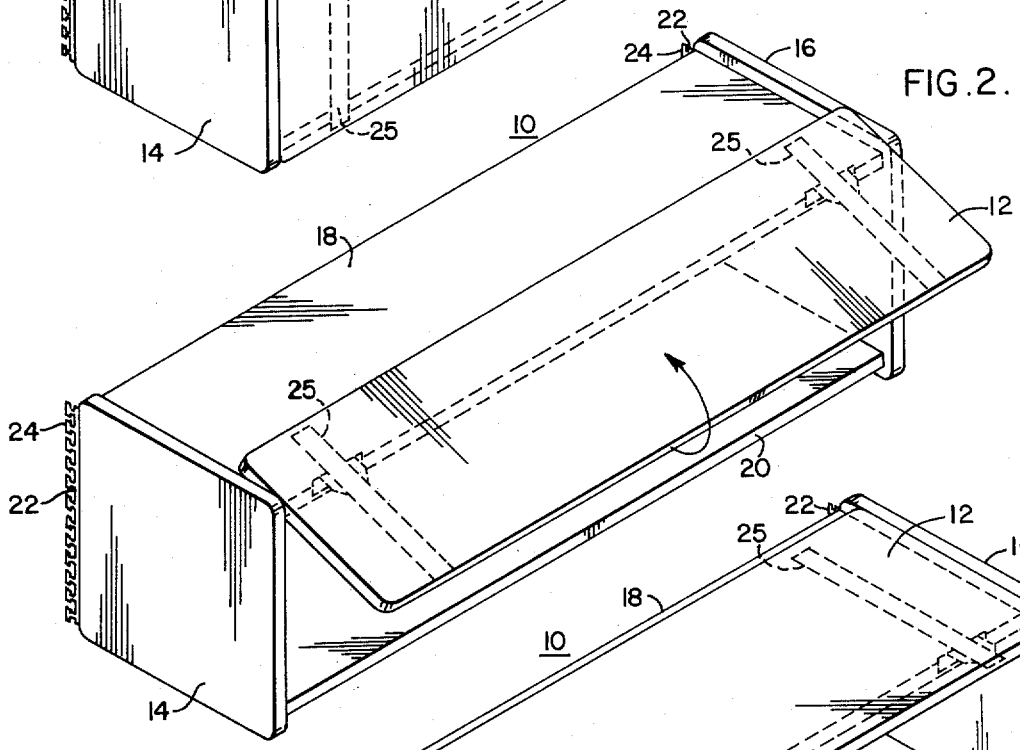
FIG. 2 is a perspective view of the cabinet of this invention with the door in a partially open position.
Figure 3:
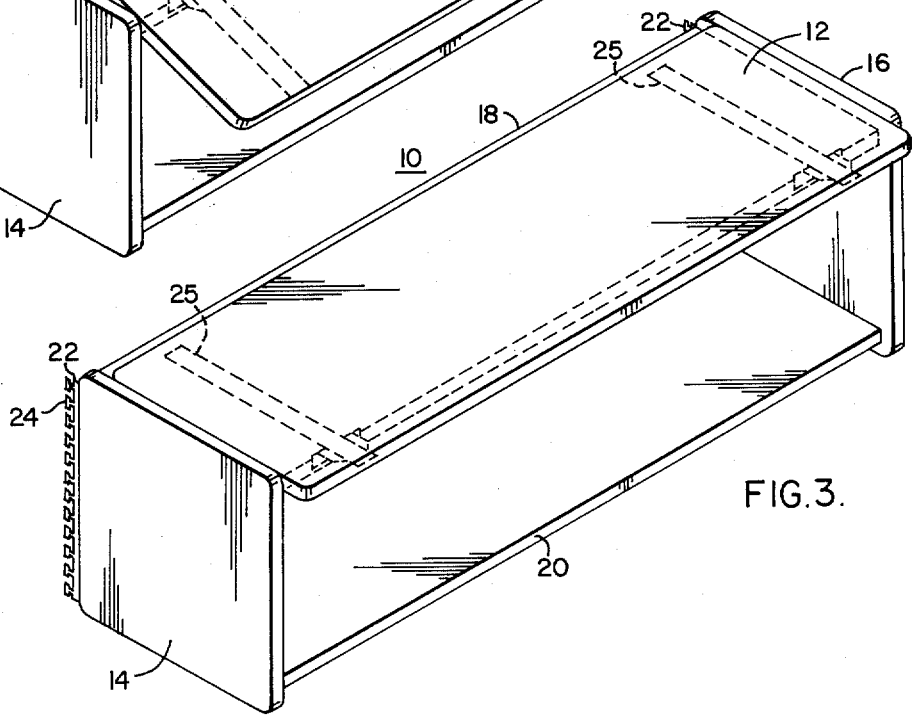
FIG. 3 is a perspective view of the cabinet of this invention with the door in an open and stored position.
Figure 4:
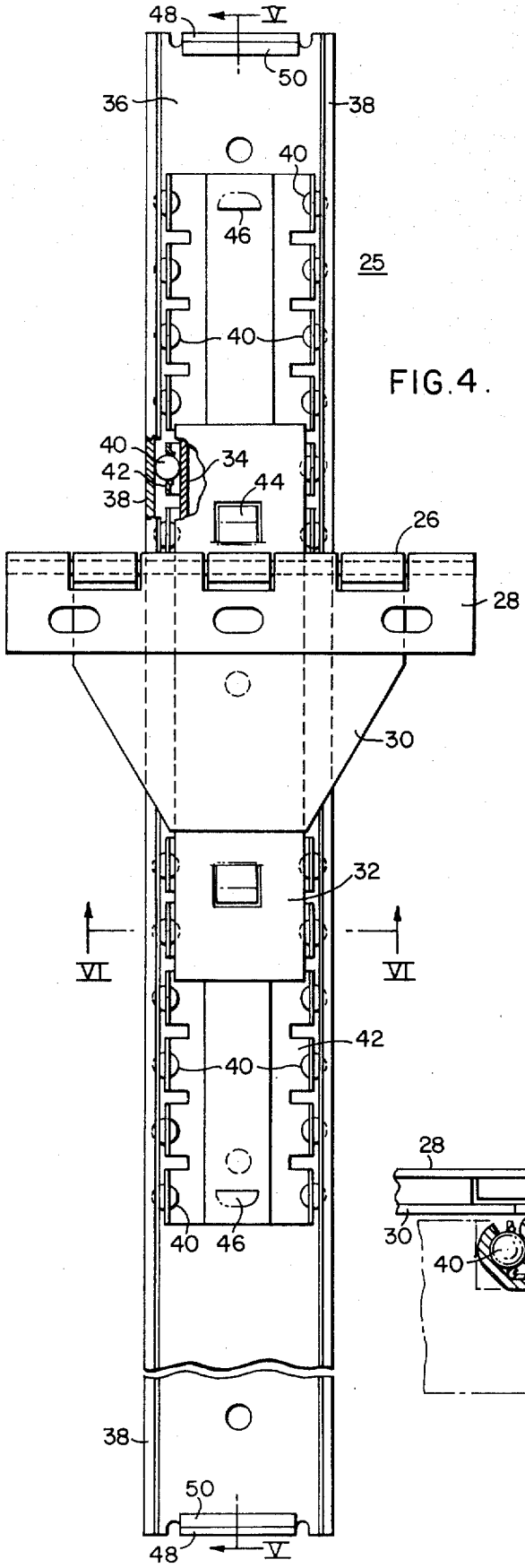
FIG. 4 is a bottom plan view of the door guide mechanism employed in this invention.
Figure 5:
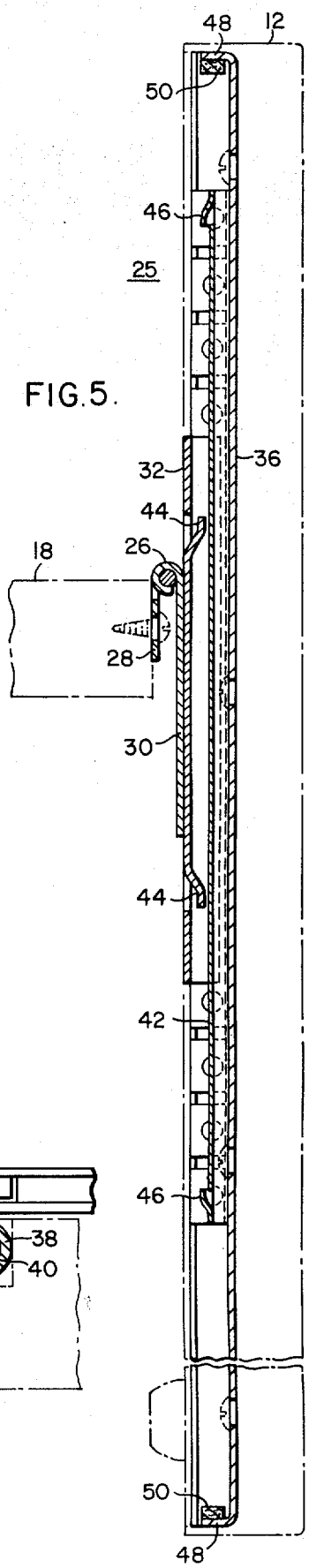
FIG. 5 is a sectional view taken along the line V—V of FIG. 4.
Figure 6:
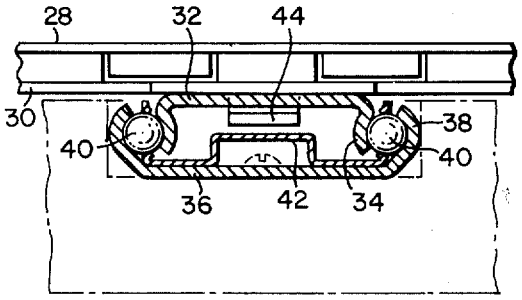
FIG. 6 is a sectional view taken along the line VI—VI of FIG. 4.

Referring now in detail to the drawing, wherein like reference characters represent like parts throughout the several views there is illustrated in FIGS. 1 through 3 the novel backless, wall mounted, cabinet of this invention, generally designated 10, with the door 12 in the closed, partially open and a fully open and stored position, respectively. The backless cabinet includes a pair of side walls 14 and 16 to which a top wall 18 and a bottom wall 20 are firmly secured in any convenient well known fashion such as screws, bolts, dowels, etc. The pair of side walls 14 and 16 and the top and bottom walls 18 and 20 form a rectangular cabinet to which the door 12 is fixed and serves as a closure. Means are provided at the rearward edge of each of the side walls 14 and 16 to mount the cabinet of this invention to a wall or space dividing panel. Although any conventional mounting means may be employed with the cabinet of this invention there is illustrated mounted to the rearward edge of said walls 14 and 16 mounting brackets 22 which include a plurality of T-shaped hooks which are compatible with the conventional slotted standards employed in many of the modern modular space dividing systems and is particularly suitable to be employed with the space dividing system disclosed in the copending application Ser. No. 159,360, filed July 2, 1971 by William C. Anderson and Raymond A. Bleeker for "Space Divider System and Connector Assembly Therefor." Since the cabinet 10 is designed to be mounted directly to the wall by mounting brackets 22 the wall serves as a back for the cabinet and it is therefore unnecessary that the cabinet be provided with its own rear wall or back.

The door member or closure 12 is affixed to the remainder of the cabinet by means of a pair of combination hinge and slide mechanisms 25. Each of the hinge and slide mechanisms 25 include a hinge member 26 that includes one plate 28 secured to the front edge of the top wall 18 and a second plate 30 that is secured to a stationary inner track member 32 which carries an inner ball bearing race 34. An outer movable track member 36 is recessed into the backside of the door 12 and extends for substantially the full height of the door as is best seen in hidden lines in FIG. 1. The outer movable rack member 36 includes an outer ball bearing race 38. A plurality of ball bearings 40 are carried on a moving ball carriage 42 which locates the balls 40 between the inner race 34 and the outer race 38. This multi-track feature allows the door member 12 to move in almost frictionless fashion from the closed position of FIG. 1 to the fully open and stored position of FIG. 3 with little effort on the part of the person opening the cabinet. The pair of spaced hinge and slide mechanisms 25 allow the cabinet door to be raised and moved to a stored position from any point along the door bottom from one end to the other even over lengths as great as a door span of 6 feet. The double track system provides for almost frictionless relative movement between the stationary track and the moving track through the multiple speed effect provided by the movable ball carriage. The movable ball carriage moves with respect to the fixed track at a first speed and the rotation of the balls doubles that speed in imparting movement to the movable track and hence the door 12. A pair of stop flanges 44 are formed in the underside of the inner stationary track member 32 which coacts with a pair of raised stop members 46 on the upper side of the ball carriage 42 to prevent the stationary track member from being overrun by the ends of the ball carriage 42. At each end of the fixed outer track member 36 is a raised stop or end 48 which has on its inner surface a felt or similar bumper 50 which serves to reduce the impact when either the end of the inner track member or the ball carriage reaches the end of its travel against the stop 48.

As will be apparent from the foregoing the backless wall mounted cabinet with over-the-cabinet door storage of this invention provides a simple and efficient mechanism for providing a closed cabinet with out-of-the-way storage for the door member. Additionally, the door member moves rapidly and with little force through almost frictionless guide mechanisms to its stored position overlying the top wall of the cabinet.

What is claimed is:

1. A backless, wall mounted, cabinet including side walls, a bottom wall and a top wall defining a front opening;

a door normally closing off said front opening defined by said side walls, said bottom wall and said top wall;

a pair of spaced hinge members secured to the front edge of said top wall, said hinge members including a hinge, a plate secured to said top wall on one side of said hinge and an inner stationary track member on the other side of said hinge;

a pair of outer movable track members secured to the back side of said door colinearly with said stationary track members on said hinge members; and a movable ball bearing carrying carriage interconnecting each of said inner stationary track members with its adjacent movable track member on said door, said door thereby being slidably movable from a position closing off said front opening to a position overlying said top wall.

2. The wall mounted cabinet according to claim 1 wherein means are associated with each of said side walls to facilitate the mounting of said cabinet to a support wall.

3. A wall mounted cabinet according to claim 2 wherein said means associated with each of said sidewalls to facilitate mounting is a mounting bracket secured to the rearward edge of each of said side walls and include a plurality of T-shaped hook members.

*4. The wall mounted cabinet according to claim 1 wherein the length of each of said ball bearing carrying carriages is significantly greater than the length of its associated inner stationary track member.*

*5. The wall mounted cabinet according to claim 1 wherein the inner stationary track members are shorter in length than either of their interconnected ball bearing carrying carriages or movable track members.*

*6. The wall mounted cabinet according to claim 5 wherein the movable track members extend for substantially the full height of said door.*

* * * * *